United States Patent [19]

Killion

[11] Patent Number: 4,615,044
[45] Date of Patent: Sep. 30, 1986

[54] INTERFACE BETWEEN VIDEO CASSETTE PLAYER AND TELEVISION RECEIVER

[76] Inventor: William D. Killion, 2232 Lindsay Michelle Dr., Alpine, Calif. 92001

[21] Appl. No.: 536,865

[22] Filed: Sep. 29, 1983

[51] Int. Cl.⁴ .............................................. H03G 3/00
[52] U.S. Cl. .................................... 381/109; 333/25; 333/32; 307/475; 358/143
[58] Field of Search .............................. 358/143, 144; 179/170 D; 381/94, 104, 109; 307/475, 491; 333/25, 32

[56] References Cited

U.S. PATENT DOCUMENTS 4,346,266  8/1982  Brockman et al. ............. 179/170 D
4,503,289  3/1985  Spires ............................ 179/170 D Primary Examiner—Forester W. Isen
Attorney, Agent, or Firm—Charles C. Logan, II

[57] ABSTRACT

The interface module is designed to insert into a cavity on the rear panel of a Sony Model VP-5000 video cassette player, from which it receives power and audio. Its purpose is to convert the unbalanced high-impedance audio of the VP-5000 into two 150 ohm unbalanced, or one 600 ohm balanced output to provide the low impedance interface required by most television equipment. It also adds an external audio level control to the VP-5000 and provides synchronizing signals, removed from an external reference video signal, to which the VP-5000 is then servo-locked to enable vertical switching between the VP-5000 output and the reference signal.

3 Claims, 1 Drawing Figure

INTERFACE BETWEEN VIDEO CASSETTE PLAYER AND TELEVISION RECEIVER

BACKGROUND OF THE INVENTION

The invention relates to video cassette players and more specifically to Sony Type 5 VCR's, such as the VP-5000, VO-5600, and VO-5800. It inserts into the recessed module cavity on the rear of the VCR which is normally used for a Sony RFK-634 RF modulator. Power for the module is provided by the VCR.

It is an object of the invention to provide a novel interface module having a circuit that will provide automatic vertical sync-lock of a Sony Type VCR to an external video source so that vertical interval switching is possible.

It is also an object of the invention to provide a novel interface module having a circuit that will convert the 47,000 ohm high-impedance audio line output of the VCR to 600 ohm balanced or dual 150 ohm unbalanced impedance for compatability with most audio equipment.

It is also an object of the invention to provide a novel interface module having a broadcast-type audio output connector that eliminates shield-grounding and hum problems.

It is another object of the invention to provide a novel interface module that eliminates the need for a separate genlock sync generator or Tbc to vertically lock the VCR to an external video source.

It is a further object of the invention to provide a novel interface module that can be installed in seconds by plugging it into the modulator cavity on the rear of the VCR without the necessity of making any modifications to the VCR unit.

DESCRIPTION OF THE PREFERRED EMBODIMENT

Figure 1:
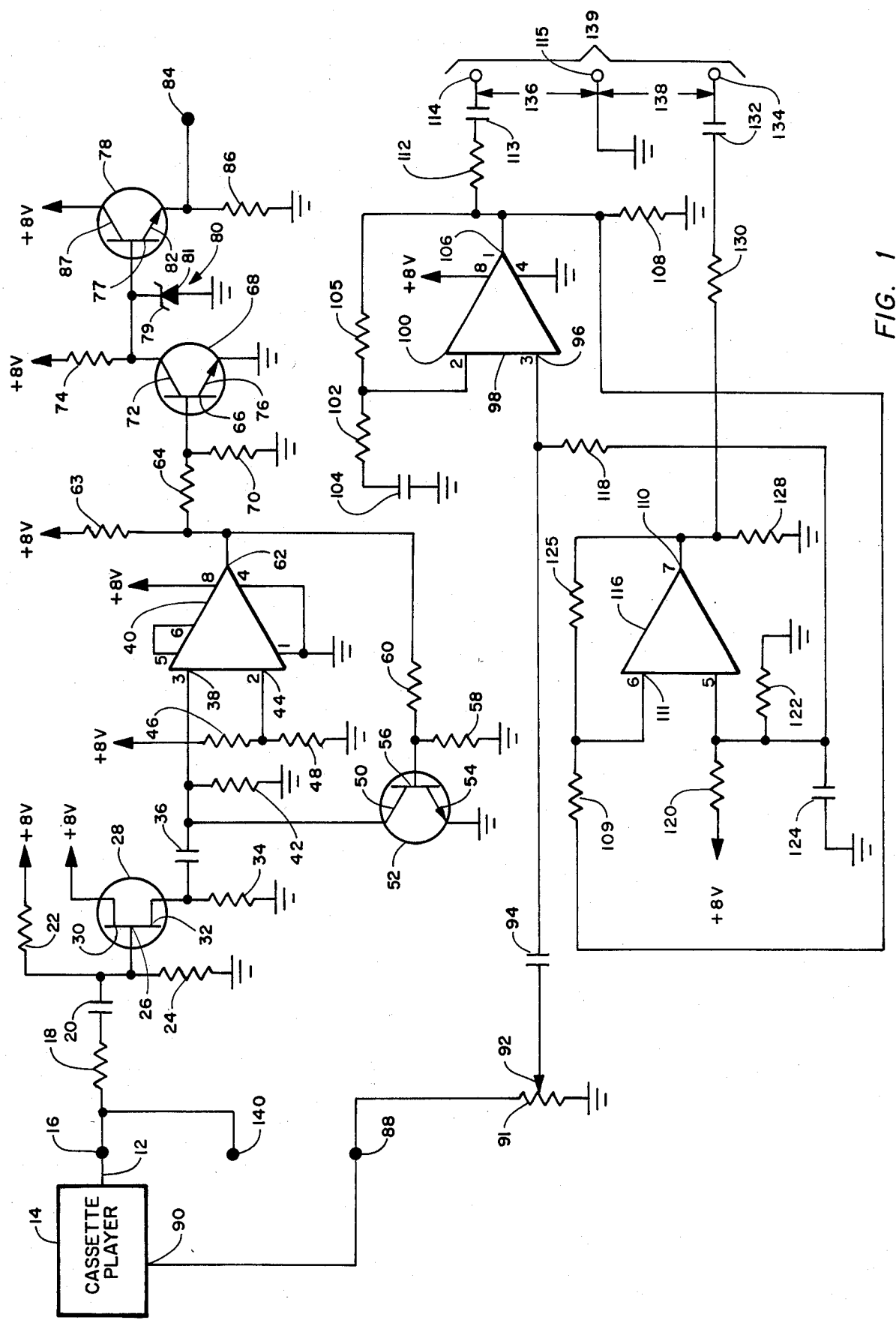

Referring now to FIG. 1, the video input 12 to the interface circuit is first taken from the output of the video cassette player 14 through a conventional terminal jack 16, next through a 4.7K ohm resistor 18 and then through a 33 micro farad capacitor 20. The output of the capacitor 20 feeds three parallel lines, one to a two meg ohm resistor 22 tied to a positive 8 volt DC potential, a second to a one meg ohm resistor 24 tied to ground potential and the third to the control gate base 26 of an FET transistor 28. An example of this transistor would be a 2N5949 or equivalent. The source connection 30 of the FET transistor 28 is connected to a positive 8 volt DC potential. The drain connection 32 to the FET transistor 28 is connected through two paths. One path through a 4.7K ohm resistor 34 to ground and another path through a 0.01 micro farad capacitor 36 to the negative terminal 38 of a signal level comparator 40. This signal level comparator consists of an LM-311 type or equivalent. The connection from the capacitor to the negative terminal 38 to the signal level comparator 40 also is paralleled through a one meg ohm resistor to ground. The positive terminal 44 of the signal level comparator takes two paths. One path is through a 4.3K ohm resistor 46 to a positive 8 volt DC potential and the other path through a 20 ohm resistor 48 to ground potential. With the use of the particular type signal level comparator selected, designated terminal 1 and terminal 4 of the comparator are tied together and terminal 1 is tied to ground potential. Likewise, terminals 5 and 6 are tied together and terminal 8 is tied to positive 8 volt DC potential.

Referring now back to the connection between the capacitor 36 and the negative input terminal 3 of the signal level comparator 40, there is also a connection to collector 50 of a transistor 52, typically a 2N3904 or equivalent. The emitter 54 of transistor 52 is shown connected to ground potential and the base 56 is connected to ground through an 820 ohm resistor 58 and through a 10K ohm resistor 60 to the output terminal 62 of the signal level comparator. The output 62 of the signal level comparator is further connected through a 1K ohm resistor 63 to the positive 8 volt DC potential and through a 27K ohm resistor 64 to the base 66 of transistor 68, typically a 2N2222 or equivalent. Between resistor 64 and the base 66 of the transistor 68 is a 5.1K ohm resistor 70 connected to ground potential. The collector 72 of transistor 68 is connected through a 1K ohm resistor 74 to the positive 8 volt DC potential and the emitter 76 is connected directly to ground potential. The collector 72 of transistor 68 is also aonnected to base 77 of transistor 78, typically of the same type, that is, 2N2222 or equivalent. The base 77 of this transistor is further connected to the cathode 79 of a Zener diode 80, typically of the 1N752 variety or equivalent with its anode 81 connected to ground potential. The emitter 82 of transistor 78 is connected through one path to a sync output terminal 84 and through another path through a 680 ohm resistor 86 tied to ground potential. The collector 87 is connected to positive 8 volt DC potential.

Jack 88 is attached to the audio output 90 of the video cassette recorder 14 and provides an audio input signal to the television equipment interface. This audio input signal is connected through a variable resistor or potentiometer 91 of 50K ohms with one end tied to ground potential. The wiper 92 of potentiometer 90 is connected through a 2.2 micro farad capacitor 94 to the positive terminal 96 of operational amplifier 98. This operational amplifier 98 is typically of the LM358 variety or equivalent. The opposite or negative terminal 100 of the operational amplifier is connected through a 10K ohm resistor 102 in series with a 0.1 micro farad capacitor 104 to ground potential and also through a 47K ohm resistor 105 to its output connection 106. Using the particular amplifier 98 above, pin 3 is the positive input, pin 2 would be the negative input, pin 8 would be the 8 volt DC input, terminal 4 is tied to ground potential and terminal 1, which is the output, is connected as described hereinbefore and also through a 750 ohm resistor 108 connected at its opposite end to ground potential as well as through a 10K ohm resistor 109 to the negative input of the other half of the LM358 operational amplifier terminal 6, the negative input 111. The output 106 from operational amplifier 116 is further connected in series through a 120 ohm resistor 112, through a 10 micro farad capacitor 113 to an output jack 114. Jack 115 is connected to ground potential for reference. A connection from the positive input 96 to operation amplifier 116 is fed through a one meg ohm resistor 118 to the positive input of the operational amplifier 116, also connected through a 1K ohm resistor 120 to the positive 8 volt DC potential and through a second 100K ohm resistor 122 to ground potential and through a 10 micro farad capacitor 124 to ground potential. Feedback to the operational amplifier 116 is provided through a 10K ohm resistor 125. Using the manufacturers designated terminal numbers to a LM358, the positive terminal would be number 5 terminal, the negative terminal would be number 6 terminal and number 7 would be the output terminal. The output terminal 11o is further connected through a 600 ohm resistor 128 to ground and also connected in series through a 120 ohm resistor 130 and a 10 micro farad capacitor 132 to the output jack 134.

OPERATION OF THE DEVICE

The following is a described of the audio circuit. Unbalanced audio at about 47,000 ohms impedance, is connected from the output of the video cassette player 14 to the instant device through plug Typically a card edge connector is utilized, however, any other type plug suitable for video and audio transfer could be used for this purpose. This audio is applied through level control potentiometer 91 and DC blocking capacitor 94 to the high impedance input of a conventional non-inverting operational amplifier gainstage 98, the gain of which has been arbitrarily established at about 4.7 to allow for a sufficient output control range to adapt to most external television equipment or other type video receiving equipment. This amplifier also provides buffering for one of the two 150 ohm audio outputs 136 which, because of the output arrangement, also becomes the interface terminal of the 600 ohm impedance balanced audio output. Both are routed through series impedance matching resistor 112 and DC blocking capacitor 113 to the output at connector 114 on the device. The unbalanced output 136 is reference to signal ground which is available at connector 115. The output of the gainstage is also routed through resistor 109 to another conventional operational amplifier stage 116, which is connected as a unity gain inverter. The purpose of this stage is to provide inversion and buffering for the second 150 ohm, unbalanced output 138 (inverted), which is also the out of phase side of the 600 ohm balanced output 139. Both are routed through series impedance matching resistor 130 and DC blocking capacitor 132 to output connector 134. The unbalanced output in reference to signal ground and the out of phase balance output in reference to the in phase balanced output at 114.

Referring now to the sync lock circuit portion of FIG. 1, loop through connectors 16 and 140 are provided to facilitate connection of the external composite video signal to which it is desired to sync lock the video cassette player. The signal is connected to 12. Connector 140 merely allows a second device to be connected to the same reference signal. For example, another interface device of the instant invention to a second video cassette recorder using the same signal. If the reference signal does not require further connection, a 75 ohm termination is added to connector 140 to properly terminate the video cable in its respective impedance.

The reference video input is coupled by series resistor 18 and DC blocking capacitor 20 to the gate 26 of FET transistor 28, which is connected in source-follower configuration to provide an input impedance of one meg ohm, which prevents loading (signal reduction) of the input video reference signal. Resistors 22 and 24 comprise a voltage divider which is used to bias transistor 28 to it's linear operating point.

The low-impedance video output of transistor 28 is routed from its source terminal, through DC blocking capacitor 36, to the minus input of signal level comparator 40, which is a conventional DC level detector circuit. The plus input 38 of comparator 40 is biased about +40 MV, as referenced to ground, by a voltage divider consisting of resistors 46 and 48. Therefore, whenever the signal on the minus input 38 of 40 is less than +40 MV, 40 conducts, causing its output to immediately swing to +8 volts DC, supplied by load resistor 63. Resistor 60 and 58 form a voltage divider which drives NPN transistor 52 into saturation only when the 40 output is high (+8 volts DC). When signal level comparator 40 saturates, since the video signal is clamped to ground at its most negative point, which is the tips of the sync pulses. Resistor 42 assures that the minus input is at ground potential, prior to collector 50 clamping action, when the AC coupled video signal is initially received.

The clamping action of transistor 56 assures that a correct ground reference signal is always present at the minus input of signal level comparator 40, enabling it to trigger on each of the sync pulses present in the video signal, regardless of any hum content on the video reference input signal to the interface device.

The output of 40 is regenerated 8 volts peak to peak inverted (positive going) composite sync signal. It is coupled through a voltage divider comprised of resistors 64 and 70 to the base of NPN transistor 68, a common emitter amplifier. Transistor 68, provided with 8 volts DC is collected by load resistor 74, saturates with each of the sync pulses received from 40, inverting the signal. The combination of load resistor 74 and Zener diode 80 clamp the negative going sync output of transistor 68 to 5.6 volts peak to peak. This signal is direct coupled to NPN transistor 78, which is an emitter, follower buffer amplifier. The negative going sync which is applied to the video cassette recorder, is reduced to 5 volts peak to peak by the diode drop inherent in the base/emitter junction of 78.

When a 5 volt peak to peak negative going composite sync signal is applied in this fashion, the circuitry and several motors of the video cassette recorder cause "sync lock" to occur, which merely means that the composite video signal output of the video cassette recorder will be in precise vertical sync timing with the referenced video input.

Without this sync lock function, the two video signals would be non-synchronous and switching a monitoring device or television receiver from one signal to the other, which is required in most television installations, would cause signal degradation in the form of picture roll or tear, or both, during the switching transition.

All the DC power required by the circuits of the interface of the instant invention is supplied either by outputs on the various video cassette recorders or by independent power packs supplying the required 8 volt DC regulated voltage.

What is claimed is:

1. An electronic high to low impedance interface circuit having a high impedance audio input and a low impedance audio output circuit comprising:
   a gain level control means (92) with an input connected to a source of high impedance of at least 20,000 ohms audio;
   a non-inverting amplifing means (98) having an output (114) and a positive input (96) and negative input operatively connected to ground potential, said positive input (96) connected to the output of said gain level control means (92); and
   a unity gain inverting amplifing means (116) having an output (134) and a positive and a negative input, said positive input operatively connected to said gain level control means and said negative input connected to the output of said non-inverting amplifing means, whereby the impedance between the outputs (114) and (134) is six hundred ohms and the impedance between either output (114) or (134) and ground potential (115) is one hundred fifty ohms.

2. The invention as defined in claim 1 wherein said gain level control means is a variable resistor divider network.

3. The invention as defined in claim 1 wherein said non-inverting amplifing means and said inverting amplifing means are operational amplifiers.

* * * * *